United States Patent
Jones et al.

(10) Patent No.: US 9,721,101 B2
(45) Date of Patent: Aug. 1, 2017

(54) SYSTEM WIDE ROOT OF TRUST CHAINING VIA SIGNED APPLICATIONS

(71) Applicant: Red Hat, Inc., Raleigh, NC (US)

(72) Inventors: Peter M. Jones, Cambridge, MA (US); Adam D. Jackson, Sommerville, MA (US)

(73) Assignee: Red Hat, Inc., Raleigh, NC (US)

( * ) Notice: Subject to any disclaimer, the term of this patent is extended or adjusted under 35 U.S.C. 154(b) by 381 days.

(21) Appl. No.: 13/925,552

(22) Filed: Jun. 24, 2013

(65) Prior Publication Data
US 2014/0380031 A1    Dec. 25, 2014

(51) Int. Cl.
*G06F 21/00*    (2013.01)
*G06F 21/57*    (2013.01)

(52) U.S. Cl.
CPC .................................. *G06F 21/572* (2013.01)

(58) Field of Classification Search
None
See application file for complete search history.

(56) References Cited

U.S. PATENT DOCUMENTS

| | | | |
|---|---|---|---|
| 6,907,524 B1 | 6/2005 | Huntington, II et al. | |
| 6,978,018 B2* | 12/2005 | Zimmer | G06F 21/57 380/30 |
| 7,395,436 B1* | 7/2008 | Nemovicher | G06F 21/6218 713/166 |
| 8,694,761 B2* | 4/2014 | Zimmer | G06F 21/575 713/1 |
| 8,918,907 B2* | 12/2014 | Lewis | G06F 21/51 713/176 |
| 9,223,982 B2* | 12/2015 | Adams | G06F 21/575 |
| 2002/0087877 A1* | 7/2002 | Grawrock | G06F 21/575 726/26 |
| 2004/0268141 A1* | 12/2004 | Zimmer | G06F 21/51 726/17 |
| 2005/0132357 A1* | 6/2005 | Shell | G06F 21/121 717/174 |

(Continued)

OTHER PUBLICATIONS

Unbuntu wiki, "Testing Secure Boot," Secure Boot, SecurityTeam/SecureBoot (last edited Apr. 15, 2013 by jdstrand, 13 pages, Available at: https://wiki.ubuntu.com/SecurityTeam/SecureBoot.

(Continued)

*Primary Examiner* — Maung Lwin
(74) *Attorney, Agent, or Firm* — Lowenstein Sandler LLP (57) ABSTRACT

A processing device searches executing at least one of a boot loader or a kernel for the operating system searches for an extensible firmware interface (EFI) binary object. Responsive to finding a first EFI binary object, the processing device verifies that a first signature associated with the first EFI binary object is valid using a platform key. Responsive to verifying that the first signature for the first EFI binary object is valid, the processing device performs the following operations: identifying a first public key encapsulated in the first EFI binary object, wherein the first public key is associated with a non-EFI certificate authority; extracting the first public key from the first EFI binary object; and performing at least one of a) passing the first public key to a kernel of an operating system (OS) or b) exposing the first public key to a user space of the OS.

20 Claims, 7 Drawing Sheets

(56) References Cited

U.S. PATENT DOCUMENTS

| | | |
|---|---|---|
| 2006/0010326 A1 | 1/2006 | Bade et al. |
| 2006/0174109 A1* | 8/2006 | Flynn .................... G06F 9/4406 713/164 |
| 2006/0224878 A1* | 10/2006 | Datta ........................ H04L 9/32 713/2 |
| 2006/0230451 A1* | 10/2006 | Kramer .................. G06F 21/56 726/22 |
| 2008/0065893 A1* | 3/2008 | Dutta ...................... H04L 9/321 713/176 |
| 2008/0148388 A1* | 6/2008 | Wooten et al. ................. 726/17 |
| 2008/0159541 A1* | 7/2008 | Kumar et al. ................ 380/278 |
| 2008/0244257 A1* | 10/2008 | Vaid ...................... H04L 9/0827 713/2 |
| 2008/0250501 A1* | 10/2008 | Wei ..................... H04L 12/2602 726/23 |
| 2009/0019528 A1* | 1/2009 | Wei ........................ H04L 63/08 726/4 |
| 2009/0031409 A1* | 1/2009 | Murray ................ H04N 21/462 726/10 |
| 2009/0300415 A1* | 12/2009 | Zhang .................. G06F 21/577 714/19 |
| 2009/0327741 A1* | 12/2009 | Zimmer et al. .............. 713/183 |
| 2010/0083002 A1* | 4/2010 | Cui et al. ....................... 713/189 |
| 2010/0169633 A1 | 7/2010 | Zimmer et al. |
| 2011/0296172 A1* | 12/2011 | Fu ........................ H04L 9/0825 713/156 |
| 2012/0005480 A1 | 1/2012 | Batke et al. |
| 2012/0054494 A1* | 3/2012 | Hiribarren .............. G06F 21/51 713/176 |
| 2012/0124357 A1 | 5/2012 | Zimmer et al. |
| 2012/0260082 A1* | 10/2012 | Bobzin .................. G06F 21/572 713/100 |
| 2012/0266259 A1* | 10/2012 | Lewis .............................. 726/30 |
| 2013/0104188 A1* | 4/2013 | Western et al. .................... 726/1 |
| 2013/0139223 A1* | 5/2013 | Woodman ............... G06F 21/42 726/4 |
| 2013/0191879 A1* | 7/2013 | Jaber .................... G06F 21/552 726/1 |
| 2014/0149730 A1* | 5/2014 | Joshi et al. ........................ 713/2 |
| 2014/0189336 A1* | 7/2014 | Ballesteros et al. ............. 713/2 |
| 2014/0250255 A1* | 9/2014 | Gordon .................. G06F 21/73 711/102 |
| 2014/0250291 A1* | 9/2014 | Adams .................... G06F 21/57 713/2 |
| 2014/0351571 A1* | 11/2014 | Jacobs ................. G06F 21/575 713/2 |
| 2014/0365755 A1* | 12/2014 | Liu et al. ......................... 713/2 |

OTHER PUBLICATIONS

St. Clair, Luke, et al., "Establishing and Sustaining System Integrity via Root of Trust Installation," The Pennsylvania State University, University Park PA 16802, 2012, 11 pages, Available at: http://www.cse.psu.edu/$^{18}$tjaeger/papers/acsac07.pdf.

* cited by examiner

SYSTEM WIDE ROOT OF TRUST CHAINING VIA SIGNED APPLICATIONS

TECHNICAL FIELD

Embodiments of the present invention relate to a secure booting platform, and more specifically to using a secure booting platform to establish a chain of trust that is usable system wide.

BACKGROUND

The Unified Extensible Firmware Interface (UEFI) is a specification that defines a software interface between an operating system and platform firmware. UEFI provides a secure boot protocol, which can secure the boot process by preventing the loading of firmware drivers and operating system (OS) loaders (also known as boot loaders) that are not signed with an acceptable digital signature. If secure boot is enabled, then only UEFI applications (e.g., firmware drivers and boot loaders) signed by a particular platform key can be loaded by firmware.

In order for a UEFI application (firmware driver or boot loader) to run on a computing device that has secure boot enabled, a developer of that UEFI application submits the UEFI application to a UEFI certificate authority (CA), which signs the UEFI application if it meets security standards (e.g., is not malware). The UEFI CA has a private key associated with the particular platform key used to verify the signature. However, the UEFI certificate authority typically signs only firmware drivers and boot loaders. Accordingly, the UEFI secure boot mechanism is not traditionally extendable to additional applications or drivers (e.g., to software drivers, an OS kernel, OS packages, third party applications, and so forth). As a result, the trusted platform key stored in hardware and/or firmware on a computing device is not traditionally usable to verify most data of an operating system.

BRIEF DESCRIPTION OF THE DRAWINGS

Embodiments of the present invention are illustrated by way of example, and not by way of limitation, in the figures of the accompanying drawings and in which.

DETAILED DESCRIPTION

A UEFI certificate authority (CA) signs UEFI applications (firmware drivers and boot loaders) that meet security criteria and that have a particular UEFI binary format. This enables these UEFI applications to execute on a computing device that has a secure boot enabled. However, the UEFI CA will not typically sign anything other than UEFI binaries for firmware drivers or boot loaders. Accordingly, the UEFI secure boot mechanism is traditionally not usable for verification of operating system (OS) packages, software packages, software device drivers, applications, or other types of data.

Most modern operating systems include a verification mechanism that is used to verify that device drivers, OS packages, software packages, applications, and other data are safe to use (e.g., are not malware) before installing and/or loading them. Each such device driver, package, application, etc. may include a signature that can be verified using a public key associated with an entity that generated the signature. However, in many cases it can be difficult to establish a chain of trust to the entity that generated the signature. Accordingly, even if the signature is verified, the verification may not be trusted in some instances because the entity that generated the signature may not be trusted.

Implementations described herein set forth a mechanism for establishing a chain of trust between trusted keys embedded in firmware and/or hardware and the keys that are used to sign device drivers, packages, applications and other data. In one implementation, a boot loader UEFI binary object is provided along with an additional UEFI binary object (referred to herein as a key container binary object, key container binary or simply key container). When the boot loader is executed on a processing device having an enabled secure boot mode, the boot loader may verify that a signature associated with the key container binary object is valid by checking the signature using a platform key. Responsive to verifying that the signature for the key container binary object is valid, the boot loader may extract a public key (or digital certificate containing the public key) from the key container binary object and pass the public key to a kernel of an operating system (OS) that is being loaded. The OS kernel may then expose the public key to a user space of the OS. The public key may then be used to verify signatures on packages, device drivers, applications, and other data. Since the public key was embedded in a UEFI binary object that was verified by the UEFI secure boot mechanism, a chain of trust is established from the UEFI CA to the public key, and signatures that are validated with the public key can be trusted. Accordingly, the chain of trust mechanisms described in embodiments herein enable trust to be extended to any part of run time services for an operating system.

Certain implementations are described herein with reference to a universal extensible firmware interface (UEFI). UEFI is a particular extensible firmware interface (EFI) between an operating system (OS) and platform firmware. UEFI includes data tables that contain platform-related information as well as boot and runtime service calls that are available to an operating system and a boot loader of the operating system. Together, these components provide a standard environment for booting an operating system and running pre-boot applications. It should be understood, however, that embodiments may also be used with other firmware interfaces (e.g., with other extensible firmware interfaces (EFIs)) that include a secure boot mechanism.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "searching", "verifying", "performing", "identifying", "extracting", "passing" or the like, refer to the actions and processes of a computing device that manipulates and transforms data represented as physical (electronic) quantities within the computing device's registers and memories into other data similarly represented as physical quantities within the computing device's memories or registers or other such information storage, transmission or display devices.

Embodiments of the present invention also relate to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present invention may be provided as a computer program product, or software, that may include a computer-readable medium having stored thereon instructions, which may be used to program a computer system (or other electronic devices) to perform a process according to the present invention. A computer-readable medium includes any non-transitory mechanism for storing information in a form readable by a machine (e.g., a computer). For example, a computer-readable medium includes a read only memory ("ROM"), random access memory ("RAM"), magnetic disk storage media, optical storage media, flash memory device, etc., but does not include carrier waves.

Figure 1:
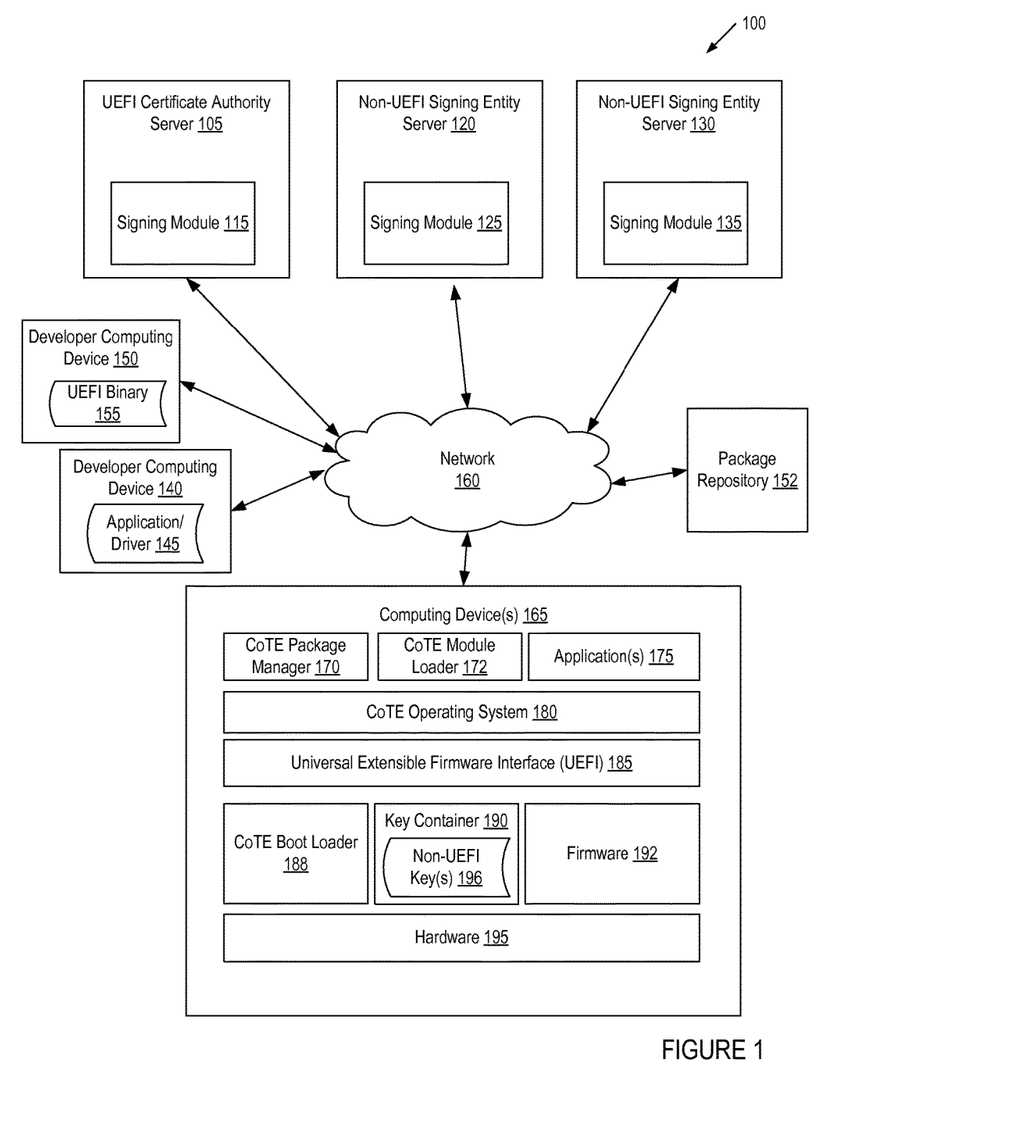
FIG. 1 illustrates an example network architecture, in which embodiments of the present invention may operate.

FIG. 1 illustrates an example network architecture 100, in which embodiments of the present invention may operate. The network architecture 100 includes a network 160, which may be a public network (e.g., the Internet), a private network (e.g., a wide area network (WAN) or intranet), or a combination thereof, that connects multiple other network components. The network architecture 100 may include one or more certificate authorities (CAs) and/or other signing entities, each having one or more servers. For example, a UEFI certificate authority server 105 and two non-UEFI signing entity servers 120, 130 may be connected to the network 160. The non-UEFI signing entities may be other certificate authorities or alternative trusted entities with digital certificates. The network architecture 100 may also include one or more developer computing devices 140, 150, a package repository 152 and/or one or more computing devices 165 connected to the network 160.

The UEFI CA server 105 and non-UEFI signing entity servers 120, 130 each include a network-accessible server-based functionality, various data stores, and/or other data processing equipment. These servers may be implemented by single machines or clusters of machines. The servers may include one or more machines (e.g., one or more server computer systems, routers, gateways, etc.) that have processing and storage capabilities to provide the server-based functionality.

Each CA and/or signing entity may include one or more public key pairs that include a private key that is kept secret and a mathematically linked public key that is made available to others. The public key may be published without compromising security, and may be used to encrypt messages that can be decrypted by the corresponding private key and to verify signatures generated by the corresponding private key. Each of the servers 105, 120, 130 includes a signing module 115, 125, 135 that may be used to sign data using private keys of the certificate authorities or signing entities. Each public key pair may be associated with a digital certificate (e.g., an X.509 certificate) that includes the public key and additional data such as an issuing body, a serial number or the digital certificate, a name of the issuer, a date of issuance, and so on.

Developers may use developer computing devices 140, 150 to develop firmware (e.g., firmware device drivers), boot loaders, software (e.g., software device drivers, applications, programs, operating system (OS) packages, etc.) and/or other executables or data. For example, developer computing device 150 may develop a UEFI binary object 155. Developer computing device 150 may include an extensible firmware interface (EFI) development kit and/or EFI toolkit for the development of the UEFI binary object 155. The UEFI binary object 155 is an object having a portable executable (PE) format with a number of headers and sections that identify how to map the object into memory. The UEFI binary object 155 may be a dynamic-link library (DLL) without symbol tables and having subtypes for a UEFI application, a UEFI boot service driver or a UEFI run-time driver.

In one embodiment, the developer UEFI binary object 155 is a key container that encapsulates one or more public keys and/or digital certificates. These keys or certificates may be additional binary data for the UEFI binary object 155, which may be stored in an additional data section of the binary object. The additional data section may be a key list. A key container UEFI binary object may be a shell UEFI application that performs no operations or that performs trivial operations. Accordingly, the key container UEFI binary object may be trivially auditable (e.g., for determining that it is not malware).

Once the UEFI binary object 155 is created, the developer computing device 150 uploads the UEFI binary object 155 to the UEFI certificate authority server 105 for signing. The UEFI CA server 105 performs a series of security verifications on the UEFI binary object 155 to ensure that the UEFI binary object 155 meets security criteria (e.g., to ensure that it is not malware). If the security criteria are satisfied, the UEFI CA server's signing module 115 signs the UEFI binary 155 and returns it to the developer computing device 140. The developer computing device 150 may then upload the signed UEFI binary 155 to the package repository 152 for distribution to computing devices (e.g., to computing devices 165), or may provide the UEFI binary to computing device 165 via another mechanism. For example, the UEFI binary may be added to an installation disk or file for an operating system.

Using a similar procedure, developer computing device 140 may develop an application, program, device driver, or other data for execution or loading by computing device 165. Once the application or driver 145 (or other data) is generated, the developer computing device 140 uploads the application or driver 145 to an appropriate non-UEFI signing entity server 120, 130 (e.g., for a non-UEFI certificate authority). A non-UEFI signing entity is a signing entity (e.g., a certificate authority) other than a UEFI certificate authority. Each of the non-UEFI signing entity servers may sign particular types of data (e.g., particular third party applications, device drivers, etc.), which typically would not be UEFI binary objects. The appropriate non-UEFI signing entity server uses its signing module 125, 135 to sign the data if the data meets signing criteria. Once an application or driver 145 (or other data) is signed, the non-UEFI signing entity server may transmit the signed version to the developer computing device 140 that requested the signature. The developer computing device 140 may then upload the signed data (e.g., signed application or driver 145) to the package repository 152 for distribution to computing devices 165.

A computing device 165 may be a personal computer, tablet computer, laptop computer, mobile phone, personal digital assistant (PDA), server computer, portable book reader, smart television, gaming console, home media center, or other type of computing device. The computing device 165 may include various hardware 195, such as memory, input/outputs, hard disk drives, processors, network adapters, input devices, display devices, and so forth. The computing device 165 may additionally include firmware 192 that interfaces with the hardware 195 (e.g., that sends commands to the hardware and receives data from the hardware). The firmware 192 may include one or more firmware device drivers, each of which may be UEFI binary objects (also referred to simply as UEFI binaries). The computing device 165 may also include a chain of trust enabled (CoTE) boot loader 188 and a key container 190. Each of the CoTE boot loader 188 and the key container 190 may also be UEFI binaries.

Computing device 165 includes a universal extensible firmware interface (UEFI) 185 that acts as an interface between an operating system 180 (e.g., a kernel of the operating system 185) and the firmware 192. When a secure boot mode is enabled, the UEFI 185 may verify each UEFI binary (e.g., CoTE boot loader 188, key container 190, and firmware device drivers) before permitting that UEFI binary to be loaded. In order to load operating system 180, UEFI 185 first verifies the CoTE boot loader 188. This verification may be performed by verifying a digital signature associated with the CoTE boot loader using a platform key stored in firmware 192 or hardware 195. The platform key may be a public key that is counterpart to a private key of the UEFI CA that signed the CoTE boot loader 188. If the signature is verified, then CoTE boot loader 188 is executed.

CoTE boot loader 188 performs an initial set of operations to load a CoTE operating system 180. This may include loading data for the operating system from secondary memory (e.g., from a disk driver or solid state drive) into main memory. In one embodiment, CoTE boot loader 188 additionally performs operations to establish a chain of trust that will extend from the UEFI CA and its trusted platform key to OS packages, applications, software device drivers, etc. that will ultimately run on the operating system 180. These operations, which are described in greater detail below with reference to FIG. 2, may include verifying key container 190 using standard UEFI verification mechanisms, extracting one or more non-UEFI keys 196 from the verified key container 190, and passing these non-UEFI keys 196 to the operating system 180 as part of the boot process. The non-UEFI keys 196 may be public keys and/or certificates that have been generated by a signing entity other than the UEFI CA.

Figure 2:
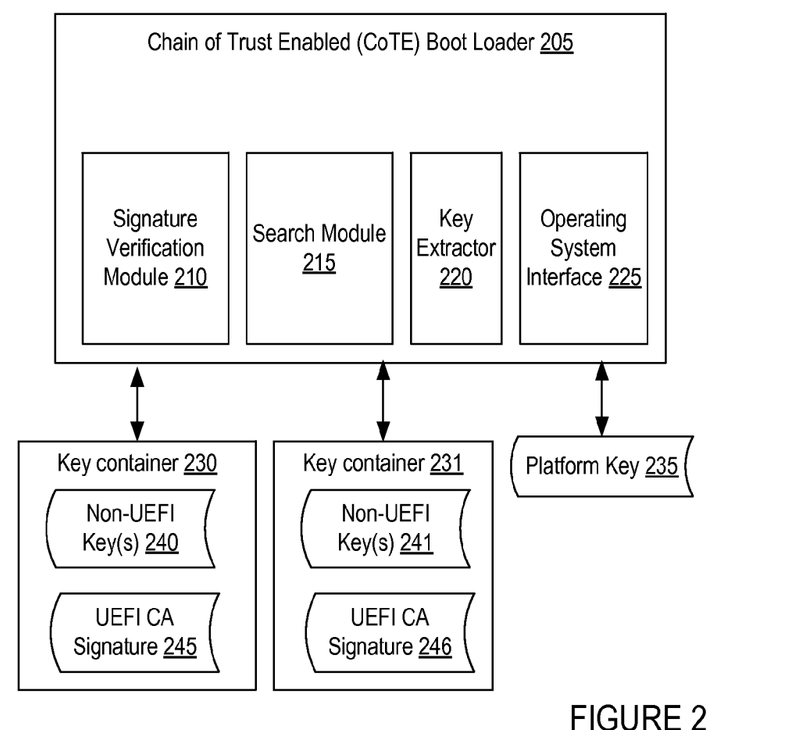
FIG. 2 illustrates a block diagram of a chain of trust enabled (CoTE) boot loader, in accordance with one implementation of the present invention.

In one embodiment, each signing entity (e.g., each trusted partner and/or CA) includes their own digital certificate that is used to sign data. To enable signatures generated by a signing entity to be trusted, the public key or digital certificate of that signing entity should be included in a key container 230, 231. In one embodiment, each key container 230, 231 is associated with a distinct signing entity. Individual key containers 230, 231 may include multiple keys 240, 241. For example, key container 230 may contain a first key for signing drivers and a second key for signing packages. Alternatively a key container may contain a single key for use with all data signing by an associated signing entity.

The CoTE operating system 180 may expose the non-UEFI keys 196 to a user space by adding the non-UEFI keys 196 to a system key ring. The non-UEFI keys may alternatively or additionally be exposed to the operating system's user space by generating a system file accessible from the user space that contains the non-UEFI keys 196. Other mechanisms for exposing the non-UEFI keys 196 may also be used. Once the non-UEFI keys 196 are exposed to the user space, any of a CoTE package manager 170, a CoTE module loader 172 or other applications 175 or processes may have access to the non-UEFI keys 196. CoTE operating system 180, CoTE package manager 170 and CoTE module loader 172 are described in greater detail below with reference to FIG. 3.

FIG. 2 illustrates a block diagram of a chain of trust enabled (CoTE) boot loader 205, in accordance with one implementation of the present invention. The CoTE boot loader 205 may include a signature verification module 210, a search module 215, a key extractor 220 and an operating system interface 225. Alternatively, the functionality of one or more of the signature verification module 210, search module 215, key extractor 220 and OS interface 225 may be combined into a single module or subdivided into additional modules.

Search module 215 searches for key containers (e.g., for key containers 230, 231). Each key container 230, 231 may be a UEFI binary object that is trivially auditable. A trivially auditable binary object is a simple binary object that has minimal or no executable code. One example of a trivially auditable UEFI binary object is a UEFI binary that includes instructions for printing the statement "Hello World." A trivially auditable UEFI binary object should easily comply with all security criteria of a UEFI CA. Accordingly, the UEFI CA may easily identify that the key containers 230, 231 are not malware.

The key containers 230, 231 may include a data field for holding non-UEFI public keys 240, 241 and/or non-UEFI certificates (certificates and/or public keys that were not generated by a UEFI CA). The non-UEFI keys 240, 241 may be RSA keys, elliptic curve cryptography (ECC) keys, digital signature algorithm (DSA) keys, and so on. Accordingly, the non-UEFI keys may be generated using the same or different cryptographic standards than those used to generate a key associated with the UEFI CA. For example, the key used to sign a key container 190 may be an RSA key, and a key encapsulated in a key container may be an ECC key. The key containers 230, 231 may additionally include a UEFI CA signature 245, 246. Since the UEFI CA signature 245, 246 is associated with the key containers 230, 231, the signatures can be used to validate an authenticity of the included non-UEFI keys 240, 241 using the UEFI secure boot mechanism of a computing device.

Once search module 215 identifies key containers 230, 231 signature verification module 210 verifies the UEFI CA signature 245, 246 of the key containers. This verification may be performed using a standard signature verification algorithm and a platform key 235. The platform key 235 may be a public key that is counterpart to a private key that was used to generate the UEFI CA signatures 245, 246 by a UEFI CA. Alternatively, verification may be performed by attempting to load the key containers 230, 231 or by querying firmware regarding whether the key container 230, 231 can be loaded. By attempting to load a key container, signature verification module 210 will invoke the signature verification functionality of the UEFI. If a key container 230, 231 is successfully loaded or executed, then it may be determined that the key container 230, 231 is valid.

Once the UEFI CA signature 245, 246 of a key container 230, 231 is verified, key extractor 220 extracts the non-UEFI keys 240, 241 from the verified key containers. Operating system (OS) interface 225 then passes the extracted non-UEFI keys 240, 241 to a kernel of an operating system as part of a boot protocol. In one embodiment, OS interface 225 passes a pointer to a list of extracted keys (or certificates) along with pointers to command line arguments as part of a handoff from the boot loader 205 to the OS 180. In one embodiment, the extracted keys are passed to the kernel of the OS 180 as an initialization vector.

Figure 3:
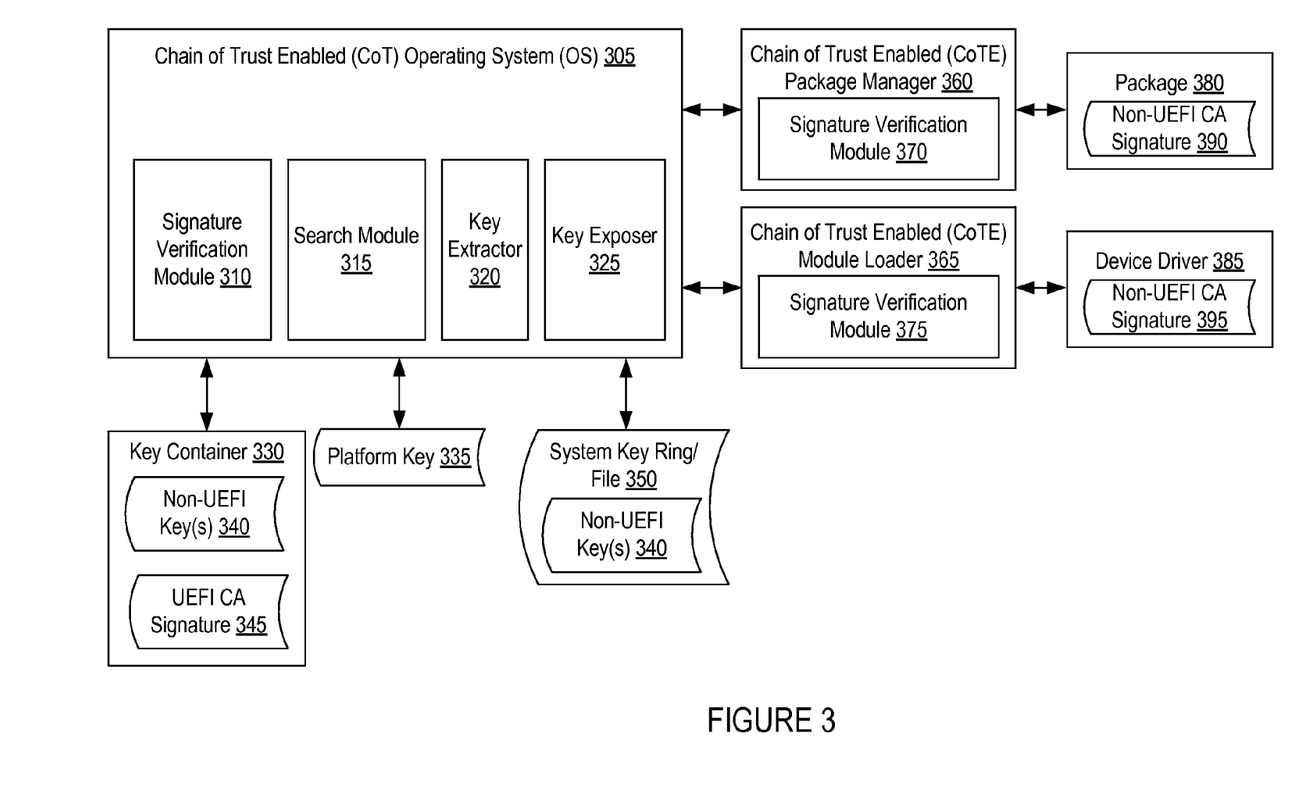
FIG. 3 illustrates a CoTE operating system, a CoTE package manager and a COTE module loader, in accordance with one implementation of the present invention.

FIG. 3 illustrates a CoTE operating system 305, a CoTE package manager 360 and a CoTE module loader 365, in accordance with one implementation of the present invention. As shown, the CoTE package manager 360 and CoTE module loader 365 are separate from the CoTE OS 305 (e.g., separate from a kernel of the OS). In alternative implementations, one or both of the package manager 360 and the module loader 365 may be components of the OS 305. For example, the package manager 360 and/or module loader 365 may be components of a kernel of the OS 305.

In one implementation, the CoTE OS 305 receives public keys and/or certificates from the boot loader during a boot process. For example, the public keys may be passed to the kernel of the OS as part of an initialization vector. In another implementation, the OS 305 may include a signature verification module 310, search module 315 and key extractor 320, which may perform the same or similar functions as the similarly named signature verification module 210, search module 215 and key extractor 220 of the CoTE boot loader 205 of FIG. 2. For example, search module 315 may search for key container 315, signature verification module 310 may verify a UEFI CA signature 345 in the key container 330 using a platform key 335, and the key extractor 320 may extract a non-UEFI key 340 from the key container 330 after the UEFI CA signature 345 is verified.

CoTE OS 305 includes a key exposer 325 that exposes the non-UEFI keys or digital certificates to a user space of the OS. Key exposer 325 may expose the non-UEFI keys 340 by adding them to a system key ring, by generating a system file containing the keys, or by other means. Key exposer 325 may also expose a secure boot indicator that indicates whether the OS was booted using a secure boot mechanism (e.g., whether a secure boot mode is enabled).

CoTE package manager 360 is a collection of tools that automate the process of installing, upgrading, configuring and removing software packages from the OS 305 in a consistent manner. Packages are distributions of software, applications and other data. Packages may additionally include metadata such as an application name, description, version number, vendor, list of dependencies, and a signature.

In one embodiment, CoTE package manager 360 includes a signature verification module 370. The signature verification module 370 may be configured to use the non-UEFI keys 340 that have been extracted from the key container 330 and that are exposed to the user space of the OS. For example, the signature verification module 370 may be configured to search for non-UEFI keys 340 in the system key ring and/or in one or more particular system files 350.

An example package 380 is shown that includes a non-UEFI CA signature 390 (a digital signature generated by a non-UEFI CA using a private key of the non-UEFI CA that is counterpart to a stored non-UEFI key 340 (which is a public key). When the package 380 is to be installed (or loaded in some instances), the signature verification module 370 searches for an appropriate non-UEFI public key 340 that is counterpart to a private key used to generate the signature 390. If the public key cannot be found, then the package will not be installed or loaded. If the public key is found, then the public key is used along with a signature verifying algorithm to verify the signature 390. If the signature 390 is valid, the package 380 may be installed or loaded. If the signature 390 is not successfully verified, then it will not be installed or loaded.

CoTE module loader 365 loads or installs kernel modules such as software device drivers on the OS 305. The module loader 365 may include a signature verification module 375 that performs the same operations that were discussed with reference to signature verification module 370. For example, signature verification module 375 may use a non-UEFI key 340 to verify a non-UEFI CA signature 395 in an example device driver 385. If the signature verification is successful, the module loader 365 may install or load the device driver 385.

Figure 4:
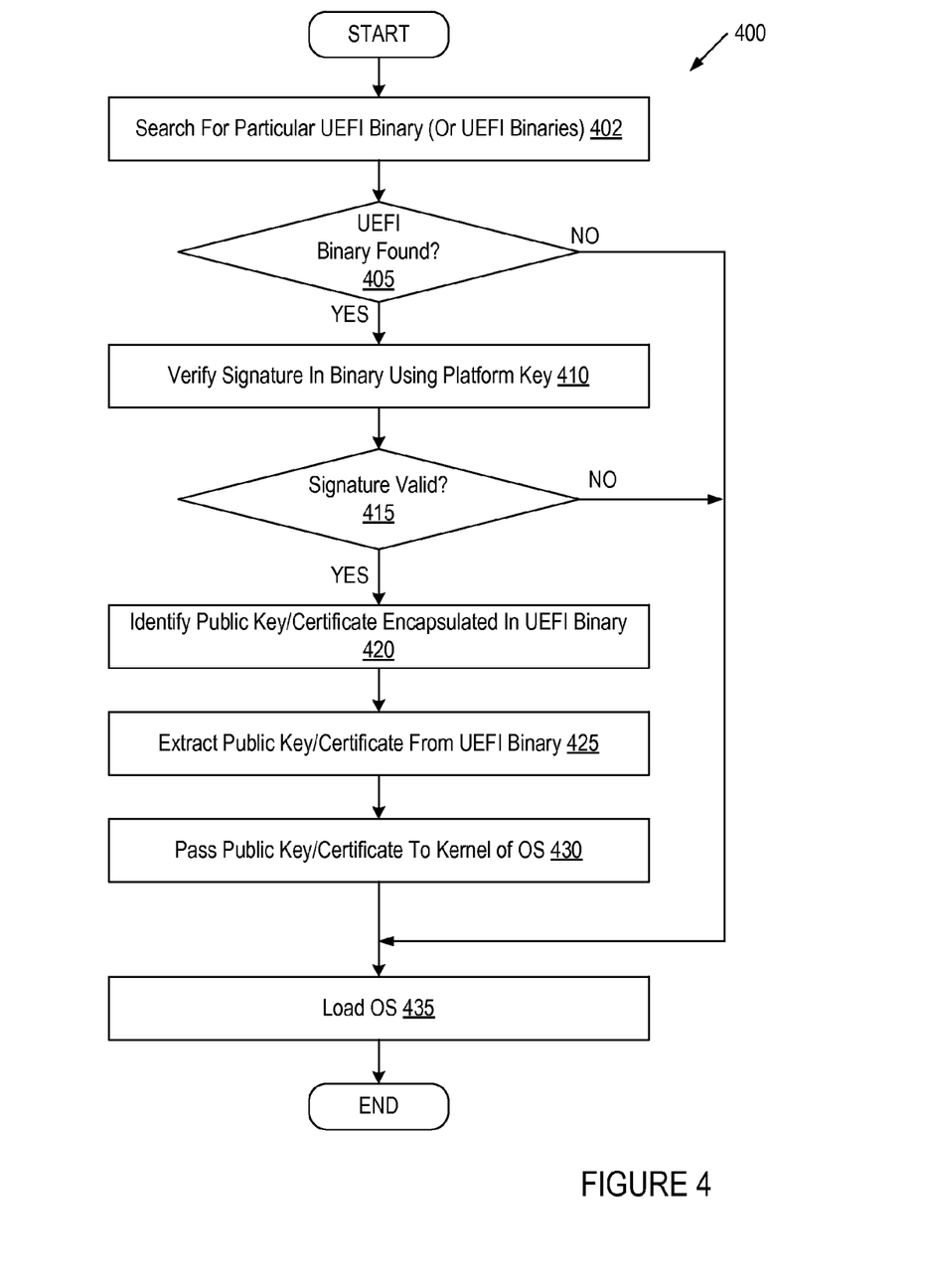
FIG. 4 illustrates a flow diagram of one embodiment for a method of validating a public key or certificate during a boot process and passing the validated public key or certificate to a kernel of an operating system.

FIG. 4 illustrates a flow diagram of one embodiment for a method 400 of validating a public key or certificate during a boot process and passing the validated public key or certificate to a kernel of an operating system. The method is performed by processing logic that comprises hardware (e.g., circuitry, dedicated logic, programmable logic, microcode, etc.), software (such as instructions run on a processing device), or a combination thereof. In one embodiment, method 400 is performed by a chain of trust enabled (CoTE) boot loader running on a computing device (e.g., CoTE boot loader 205 of FIG. 2).

Referring to FIG. 4, at block 402 of method 400, processing logic searches for a particular UEFI binary (or for particular UEFI binaries). Processing logic may search for UEFI binaries that are stored in a particular location (e.g., in a same directory as a boot loader binary) and/or for UEFI binaries having a particular name (e.g., labeled as key containers). If at block 405 an appropriate UEFI binary is found, the method continues to block 410. Otherwise, the method proceeds to block 435.

At block 410, processing logic verifies a digital signature in the UEFI binary (or multiple UEFI binaries) using a platform key (which may be stored in firmware and/or hardware). If at block 415 the signature is valid, the method continues to block 420. If the signature is not valid, the method proceeds to block 435.

At block 420, processing logic identifies a public key or certificate (or multiple public keys or certificates) encapsulated in the UEFI binary. At block 425, processing logic extracts the public key or certificate from the UEFI binary. At block 430, processing logic passes the public key or certificate (or multiple public keys or certificates) to a kernel of the operating system. The public key or certificate may be passed as part of a boot protocol (e.g., as a component of an initialization vector for an OS). At block 435, processing logic proceeds with loading the OS.

Figure 5:
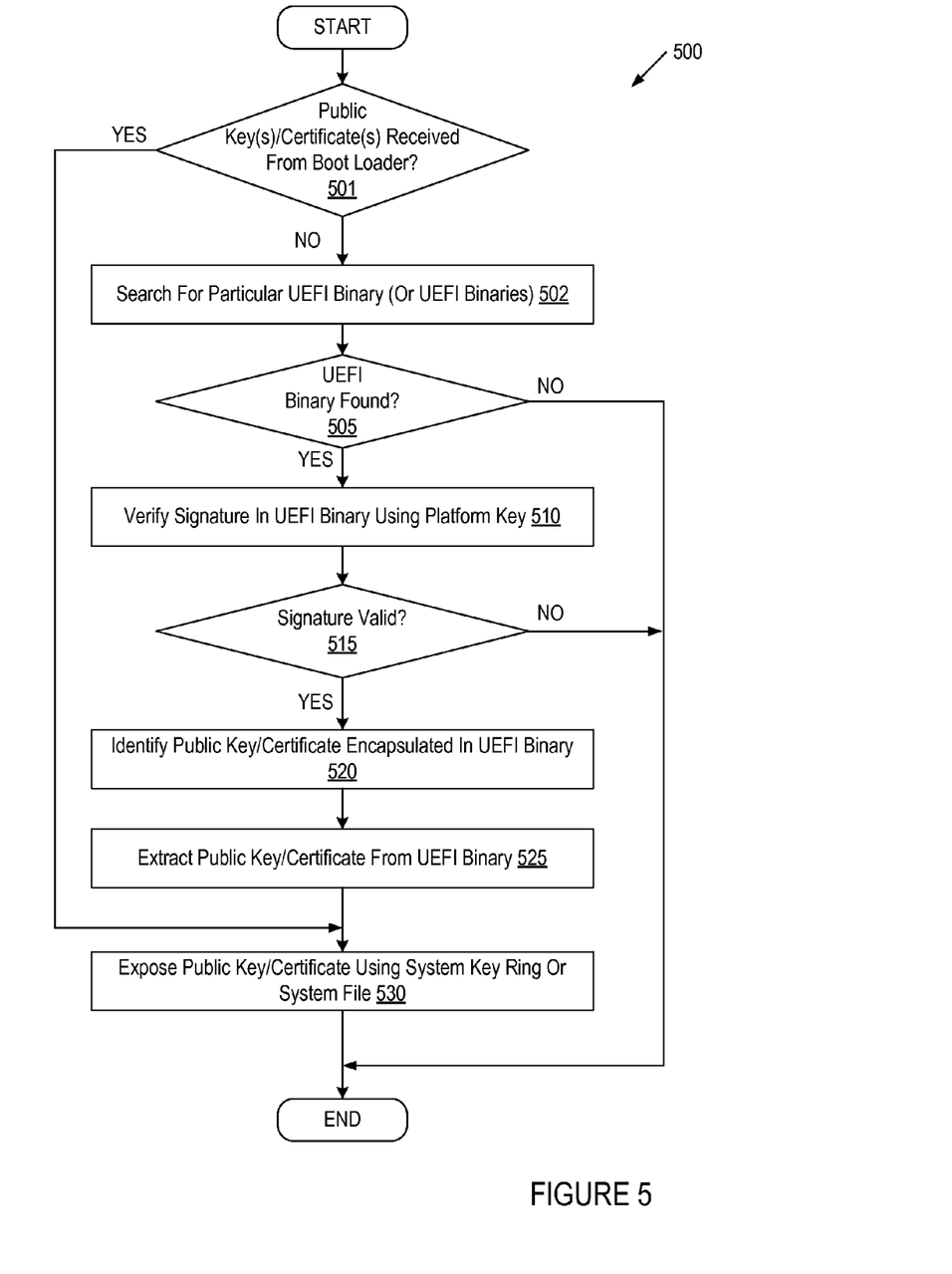
FIG. 5 illustrates a flow diagram of one embodiment for a method of exposing a public key or certificate that was validated during a boot process for use by a package manager and/or module loader.

FIG. 5 illustrates a flow diagram of one embodiment for a method 500 of exposing a public key or certificate that was validated during a boot process for use by a package manager and/or module loader. The method is performed by processing logic that comprises hardware (e.g., circuitry, dedicated logic, programmable logic, microcode, etc.), software (such as instructions run on a processing device), or a combination thereof. In one embodiment, method 500 is performed by a chain of trust enabled (CoTE) operating system kernel running on a computing device (e.g., CoTE OS 305 of FIG. 3).

Referring to FIG. 5, at block 501 of method 500, processing logic determines whether any public keys (e.g., non-UEFI public keys) or certificates have been received from a boot loader. If so, the method may proceed to block 530. If no public keys or certificates have been received from the boot loader, the method continues to block 502.

At block 502, processing logic searches for a particular UEFI binary or binaries. At block 505, if a UEFI binary matching search criteria is found (e.g., that has a particular name or is in a particular location), the method continues to block 510. Otherwise the method ends.

At block 510, processing logic verifies a signature in the UEFI binary using a stored platform key. At block 515, if the signature is verified the method continues to block 520, at which a public key or certificate encapsulated in the UEFI binary is identified and to block 525, at which the identified public key or certificate is extracted from the UEFI binary. If at block 515 the signature is not verified, the method ends.

At block 530, processing logic exposes the received or extracted public key (or certificate) to a user space of the operating system using, for example, a system key ring (an array of trusted keys and/or certificates) or a system file. The method then ends.

Figure 6:
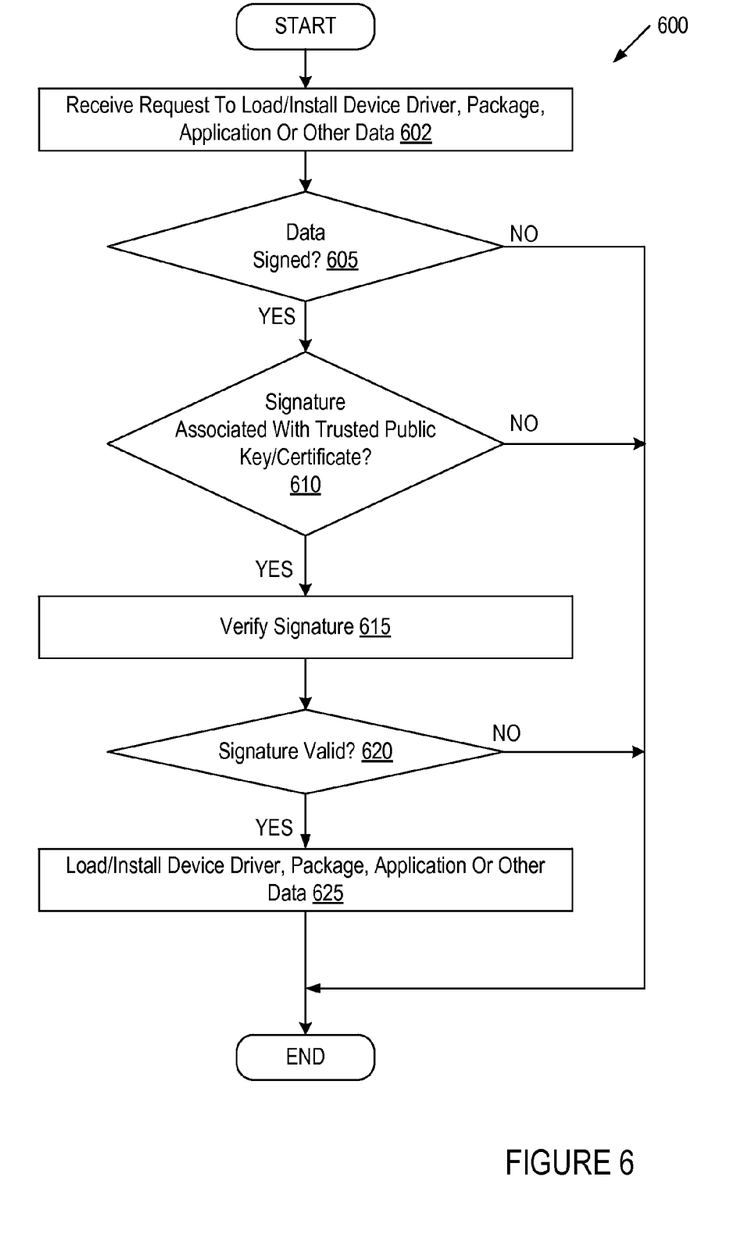
FIG. 6 illustrates a flow diagram of one embodiment for a method of validating a package, device driver or application for installation or loading on an operating system.

FIG. 6 illustrates a flow diagram of one embodiment for a method of validating a package, device driver or application for installation or loading on an operating system. The method is performed by processing logic that comprises hardware (e.g., circuitry, dedicated logic, programmable logic, microcode, etc.), software (such as instructions run on a processing device), or a combination thereof. In one embodiment, method 600 is performed by a chain of trust enabled (CoTE) package manager or module loader running on a computing device (e.g., CoTE package manager 360 or CoTE module loader 365 of FIG. 3).

Referring to FIG. 6, at block 602 of method 600, processing logic receives a request to load or install a device driver, package, application or other data. At block 605, processing logic determines whether the data is signed. If the data is unsigned, then the method ends. If the data is signed, the method continues to block 610.

At block 610, processing logic determines whether the signature is associated with a public key or certificate that is trusted (e.g., whether the signature was generated using a private key that is counterpart to a trusted stored public key). A public key or certificate may be trusted if it was extracted from a UEFI binary that has been verified at boot up by a secure boot process. If the signature is not associated with a trusted public key or certificate, the method ends. If the signature is associated with a trusted public key or certificate, the method proceeds to block 615.

At block 615, processing logic verifies the signature associated with the data using a signature verification algorithm and the identified trusted public key. If the signature is not successfully verified (is invalid), the method ends. If the signature is successfully verified (is valid), the method proceeds to block 625. At block 625, processing logic loads or installs the device driver, package, application or other data. The method then ends.

Figure 7:
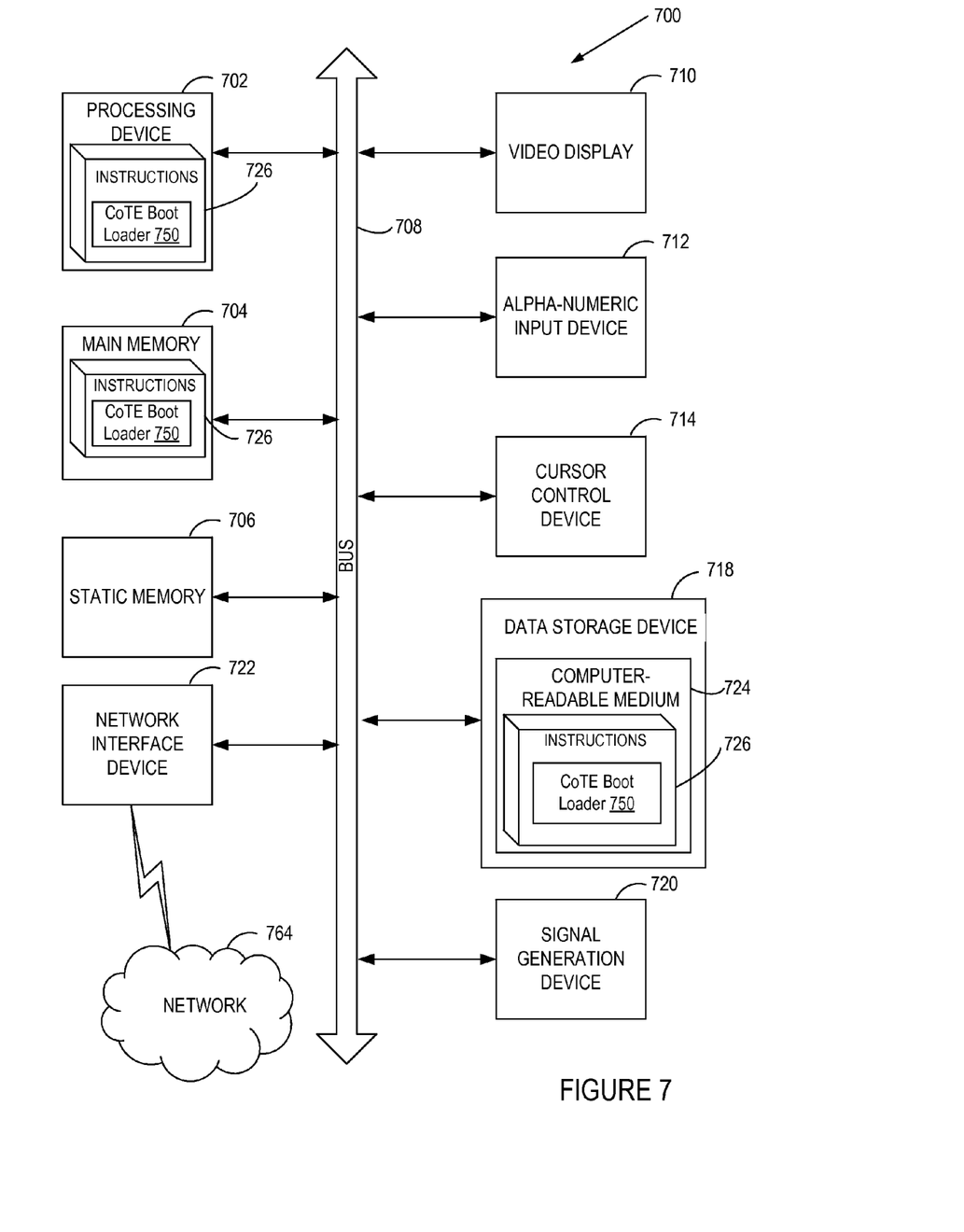
FIG. 7 illustrates a block diagram of an example computer system, in accordance with one implementation of the present invention.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computing device 700 corresponds to computing device 165 of FIG. 1.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 708.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 726) for performing the operations and steps discussed herein.

The computing device 700 may further include a network interface device 722. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a machine-readable storage medium (or more specifically a computer-readable storage medium) 724 on which is stored one or more sets of instructions 726 embodying any one or more of the methodologies or functions described herein. The instructions 726 may also reside, completely or at least partially, within the main memory 704, within the static memory 706 and/or within the processing device 702 during execution thereof by the computer system 700, the main memory 704, static memory 706 and the processing device 702 also constituting computer-readable storage media.

The computer-readable storage medium 724 may also be used to store a CoTE boot loader 750, CoTE OS kernel (not shown), CoTE package manager (not shown) and/or CoTE module loader (not shown), and/or a software library containing methods that call a CoTE boot loader 750, CoTE OS kernel, CoTE package manager and/or CoTE module loader. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    searching, by a processing device having an enabled secure boot mode, for a key container comprising no executable code;
    responsive to finding a first key container encapsulating a first signature and a first public key, verifying that the first signature is valid using a platform key, the platform key comprising a public key that is a counterpart to a private key associated with an extensible firmware interface (EFI) certificate authority and used to generate the first signature; and
    responsive to verifying that the first signature for the first key container is valid, performing, by the processing device, the following comprising:
        identifying the first public key encapsulated in the first key container, wherein the first public key is different than the platform key and is associated with a non-EFI certificate authority;
        extracting the first public key from the first key container; and
        passing the first public key to a kernel of an operating system (OS) of the processing device.

2. The method of claim 1, further comprising:
    identifying at least one additional public key encapsulated in the first key container;
    extracting the at least one additional public key from the first key container; and
    passing the at least one additional public key to the kernel of the OS of the processing device.

3. The method of claim 1, further comprising:
    responsive to finding a second key container, verifying that a second signature associated with the second key container is valid using the platform key; and
    responsive to verifying that the second signature for the second key container is valid, performing the following comprising:
        identifying a second public key encapsulated in the second key container, wherein the second public key is associated with an additional non-EFI certificate authority (CA);
        extracting the second public key from the second key container; and
        passing the second public key to the kernel of the OS.

4. The method of claim 1, wherein the first public key is a component of a first digital certificate encapsulated in the first key container, and wherein the first public key is usable to sign at least one of packages or kernel modules that are not compliant with an EFI standard.

5. The method of claim 1, wherein the first key container comprises a universal extensible firmware interface (UEFI) application that is trivially auditable.

6. The method of claim 1, further comprising:
    exposing the first public key to a user space of the OS by placing the first public key in at least one of a system key ring or a system file.

7. The method of claim 6, further comprising:
    loading a package manager in the user space of the OS, wherein responsive to a request to install or load a package signed by the non-EFI CA, the package manager verifies a digital signature associated with the package using the exposed first public key.

8. The method of claim 1, wherein the platform key complies with a first public key cryptography standard, and the first public key complies with a second, different, public key cryptography standard.

9. The method of claim 1, further comprising:
    exposing the first public key to a module loading component of the OS to enable the module loading component to verify device drivers prior to loading the device drivers.

10. A non-transitory computer readable medium comprising instructions that, when executed by a processing device having an enabled secure boot mode, cause the processing device to:
    search, by the processing device, for an extensible firmware interface (EFI) binary object comprising no executable code;
    responsive to finding a first EFI binary object encapsulating a first signature and a first public key, verify that the first signature is valid using a platform key, the platform key comprising a public key that is a counterpart to a private key associated with an extensible firmware interface (EFI) certificate authority and used to generate the first signature; and responsive to verifying that the first signature for the first EFI binary object is valid, the processing device further to:
identify the first public key encapsulated in the first EFI binary object, wherein the first public key is different than the platform key and is associated with a non-EFI certificate authority;
extract the first public key from the first EFI binary object; and
perform at least one of a) passing the first public key to a kernel of an operating system (OS) of the processing device or b) exposing the first public key to a user space of an OS of the processing device.

11. The computer readable storage medium of claim 10, the processing device further to:
identify at least one additional public key encapsulated in the first EFI binary object;
extract the at least one additional public key from the first EFI binary object; and
pass the at least one additional public key to the kernel of the OS of the processing device.

12. The computer readable storage of claim 10, the processing device further to:
responsive to finding a second EFI binary object, verify that a second signature associated with the second EFI binary object is valid using the platform key; and
responsive to verifying that the second signature for the second EFI binary object is valid, the processing device further to:
identify a second public key encapsulated in the second EFI binary object, wherein the second public key is associated with an additional non-EFI certificate authority (CA);
extract the second public key from the second EFI binary object; and
pass the second public key to the kernel of the OS of the processing device.

13. The computer readable storage medium of claim 10, wherein the first public key is a component of a first digital certificate encapsulated in the EFI binary object, and wherein the first public key is usable to sign at least one of packages or kernel modules that are not compliant with an EFI standard.

14. The computer readable storage medium of claim 10, wherein the EFI binary object comprises a universal extensible firmware interface (UEFI) application that is trivially auditable.

15. The computer readable storage medium of claim 10, the processing device further to:
expose the first public key to the user space of the OS by placing the first public key in at least one of a system key ring or a system file.

16. The computer readable storage medium of claim 15, the processing device further to:
load a package manager in the user space of the OS, wherein responsive to a request to install or load a package signed by the non-EFI CA, the package manager verifies a digital signature associated with the package using the exposed first public key.

17. The computer readable storage medium of claim 10, wherein the platform key complies with a first public key cryptography standard, and the first public key complies with a second, different, public key cryptography standard.

18. The computer readable storage medium of claim 10, the processing device further to:
expose the first public key to a module loading component of the OS to enable the module loading component to verify device drivers prior to loading the device drivers.

19. A computing device comprising:
a memory; and
a processing device operatively coupled to the memory, wherein the processing device is to:
search for an extensible firmware interface (EFI) binary object comprising no executable code;
responsive to finding a first EFI binary object encapsulating a first signature and a first public key, verify that the first signature is valid using a platform key, the platform key comprising a public key that is a counterpart to a private key associated with an extensible firmware interface (EFI) certificate authority and used to generate the first signature; and
perform the following comprising responsive to verifying that the first signature for the first EFI binary object is valid:
identify the first public key encapsulated in the first EFI binary object, wherein the first public key is different than the platform key and is associated with a non-EFI certificate authority;
extract the first public key from the first EFI binary object; and
expose the first public key to a user space of an operating system of the processing device.

20. The computing device of claim 19, wherein the first public key is a component of a first digital certificate encapsulated in the EFI binary object, and wherein the first public key is usable to sign at least one of packages or kernel modules that are not compliant with an EFI standard.

* * * * *